United States Patent [19]
Suzuki et al.

[11] 4,092,631
[45] May 30, 1978

[54] PATTERN RECOGNITION SYSTEMS

[75] Inventors: Chuji Suzuki, Nara; Syoichi Yasuda; Yoshiki Nishioka, both of Tenri, all of Japan

[73] Assignee: Sharp Kabushiki Kaisha, Osaka, Japan

[21] Appl. No.: 716,347

[22] Filed: Aug. 20, 1976

Related U.S. Application Data

[63] Continuation of Ser. No. 465,487, Apr. 30, 1974, abandoned.

[51] Int. Cl.² .............................................. G06K 9/06
[52] U.S. Cl. ........................ 340/146.3 J; 340/146.3 Y
[58] Field of Search .................. 340/146.3 J, 146.3 Y, 340/146.3 AC, 146.3 R

[56] References Cited
U.S. PATENT DOCUMENTS

| | | | |
|---|---|---|---|
| 3,268,865 | 8/1966 | Berkin | 340/146.3 Y |
| 3,290,651 | 12/1966 | Paufve et al. | 340/146.3 Y |
| 3,519,991 | 7/1970 | Kobayashi | 340/146.3 J |
| 3,593,287 | 7/1971 | Kobayashi et al. | 340/146.3 J |
| 3,710,319 | 1/1973 | Miller et al. | 340/146.3 J |
| 3,714,630 | 1/1973 | Cribbs | 340/146.3 J |
| 3,772,648 | 11/1973 | Schlang | 340/146.3 J |

Primary Examiner—Leo H. Boudreau
Attorney, Agent, or Firm—Birch, Stewart, Kolasch & Birch

[57] ABSTRACT

In pattern recognition systems for determining and recognizing any normalized characters registered in a record medium by means of a character characteristic extractor, the presence and absence of two-dimensional intelligence signals contained within the normalized characters to be recognized is determined by the consecutive scanning by only a single vertical array of light-sensitive elements, while the record medium travels horizontally with respect to said vertical array. Multiple intelligence signals for the vertical segments of each vertical scanning developing across the respective elements are combined together in a signal compression mode and then introduced into a pattern decoding matrix in order to extract the character characteristic or pattern based upon a combination of the compressed intelligence signals.

6 Claims, 10 Drawing Figures

| | | | 0 | 1 | 2 | 3 | 4 | 5 | 6 | 7 | 8 | 9 |
|---|---|---|---|---|---|---|---|---|---|---|---|---|
| WP | a | | / | 1 | / | / | 1 | / | / | 1 | / | / |
| | b | | / | / | / | / | 0 | / | 1 | 0 | / | 1 |
| | c | | 1 | / | / | / | 0 | / | 0 | 0 | / | 0 |
| | d | | 0 | / | 1 | 1 | 0 | 1 | 0 | 0 | 1 | 0 |
| $WP_a$ | e | | / | / | 1 | 0 | 1 | / | / | 0 | / | 1 |
| | f | | 1 | / | 0 | 0 | 0 | 1 | 1 | 0 | 1 | 0 |
| $WP_b$ | g | | / | / | / | / | / | / | 1 | 1 | / | / |
| | h | | 1 | / | 1 | 1 | / | 0 | 0 | 1 | 1 | 1 |
| wc rwd | i | | 0 | 1 | 0 | 0 | 0 | 0 | 0 | 0 | 0 | 0 |

PATTERN RECOGNITION SYSTEMS

This application is a continuation, of copending application Ser. No. 465,487, filed on Apr. 30, 1974, now abandoned.

BACKGROUND OF THE INVENTION

The present invention relates to a system and a method employed in that system for recognizing and identifying characters based upon intelligence signals which are obtained during scanning operations.

In the past, one way of reading and recognizing normalized characters written on an appropriate record medium such as an embossed card is to establish a memory storing all of two-dimentional intelligence signals being obtained during the scanning process and then to recognize characters from the two-dimentional intelligence signals contained in the memory. Therefore, in order to recognize the individual normalized characters, it is required to provide a large number of memory cells, which result in a complicated recognition circuit and a full-sized reader arrangement.

Accordingly, it is an object of the present invention to provide an effective character recognition system requiring a considerably simpler and more inexpensive memory requirement.

It is another object of the present invention to provide an improved character recognition system which can simplify an information manipulation and recognition arrangement required for scanning, reading and recognizing normalized characters registered on a record medium.

It is still another object of the present invention to provide an improved character recognition system which can operate without regard to variations in relative positions between a reading station and normalized characters to be recognized.

To achieve the above-described objects, the present invention resides in the system which employs both a characteristic extraction method and an information compression method. That is to say, while the normalized characters are being scanned and read for example in the vertical direction, characteristics of the characters in the vertical direction are determined in an information compression mode each scanning operation. Variations of the determined characteristics in the horizontal direction are also viewed by a repetition of the scanning operations so that the two-dimentional characteristics are derived and confirmed therefrom upon the completion of the scanning operations. The determination of these variations in the horizontal direction is carried out during a specified number of scanning cycles which corresponds to the characteristics to be viewed in the horizontal direction.

BRIEF DESCRIPTION OF THE DRAWINGS

Other objects and many of the attendant advantages of the present invention will be readily appreciated as the same becomes better understood by reference to the following detailed description when considered in conjunction with the accompanying drawings, in which like reference numerals designate like parts throughout the figures thereof and wherein.

DESCRIPTION OF THE PREFERRED EMBODIMENTS

The character recognition system and method of the present invention briefly described in the foregoing will now be discussed in greater detail with reference to an embodiment for performing the reading of numerals 0 through 9 written in the form of FARRINGTON 7B.

Figure 1:
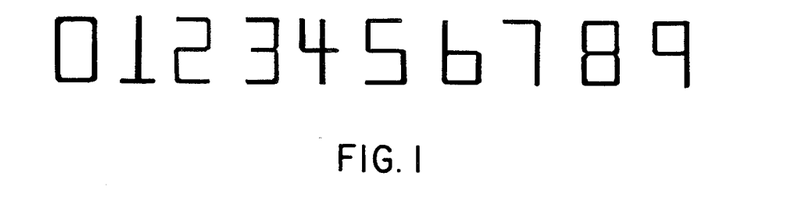
FIG. 1 is an illustration of a font style of 0 through 9 in the form of FARRINGTON 7B.
Figure 2:
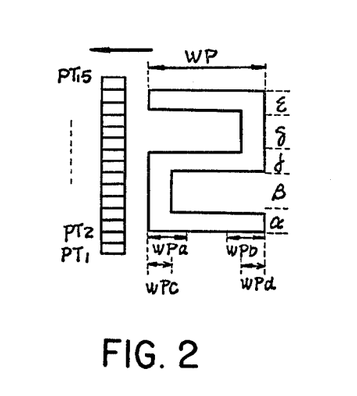
FIG. 2 is an illustration of an alignment of read-out cells and each individual characteristic detection period.

FIG. 1 illustrates a font of numerals 0 through 9 in the form of FARRINGTON 7B normally employed in the art. Summarizing the operational principles of the character reading, for example, the numeral "2" is defined by a series of embossments on a card as shown in FIG. 2; the required number of read-out cells PT such as photo-transistors and the like are aligned in an array. Then, the sequential scanning of the aligned read-out cells enables the subject character to be read out in the vertical direction. At this time, card moves for example in the direction of the arrow permitting the read-out cells to scan the whole of the subject character on the embossed card by means of a plurality of vertically-running scanning lines. In the system of the present invention, the characteristics in connection with the vertical direction of the subject character are sensed in the well known information compression mode during each scanning line period. More specifically, as shown in FIG. 2, the subject character is divided into five regions in the vertical direction, and intelligence signals for each individual region from the read-out cells are compressed to develop compression information $\alpha, \beta, \gamma, \delta, \epsilon$. Various combinations of the thus obtained compression information $\alpha, \beta, \gamma, \delta, \epsilon$ can then specify characteristics (a)–(i) necessary for identifying the numerals 0 through 9 of FARRINGTON 7B.

In the illustrative embodiment, the aforementioned characteristics (a)–(i) may be displayed in accordance with the specific font of FARRINGTON 7B as follows:

a. one wherein at least one intelligence signal of full length exists during the period Wp (intelligence signals have very short length interruption may be included herein).

b. one wherein two intelligence signals of relatively short length exist successively during the period Wp.

c. one wherein two intelligence signals of relatively short length exist widely spaced during the period $W_p$, and thus they exist at the beginning and terminating points of the scanning operation.

d. one wherein three intelligence signals of relatively short length exist during the period Wp.

e. one wherein one intelligence signal of more than half length exists, and one intelligence signal of relatively short length follows the same during the period Wpa.

f. one wherein an intelligence signal of more than half length exists after a short length signal, or two intermediate length signals or one full-length signal exist during the period Wpa.

g. one wherein one intelligence signal of intermediate length exists or one short length intelligence signal follows the same during the period Wpb.

h. one wherein the same as defined in (f) exists during the period Wpd.

i. one wherein one intelligence signal of relatively short length exists at the beginning point during the period Wpc + Wpd.

In the above, assuming that the total of the scanning lines amounts to 20, as depicted in FIG. 2, Wp. the scanning period for the whole of the character.

Wpa. the scanning period for the first six scanning lines.

Wpb. the scanning period for the last six scanning lines.

Wpc. the scanning period for the first three scanning lines.

Wpd. the scanning period for the last three scanning lines.

Figure 3:
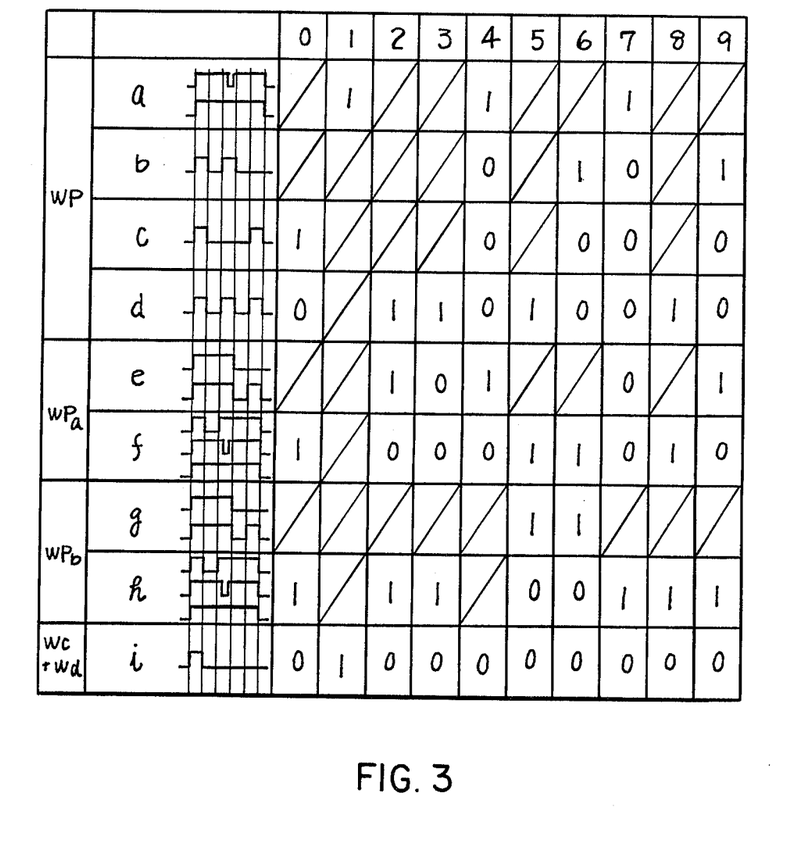
FIG. 3 is a truth table for character determination logic for the purpose of recognizing the individual numerals 0 through 9 in the form of FARRINGTON 7B.

FIG. 3 illustrates the character determination logic required for identifying the numerals 0 through 9 of FARRINGTON 7B FONT, wherein the existance of the above discussed characteristics is denoted as a binary "1" and the absence thereof is denoted as a binary "0". In this drawing, any intelligence signals which may appear on the areas marked by the oblique lines should be omitted from the recognition procedure.

In this manner, pursuant to the system and method embodying the present invention, the character characteristics in the vertical direction are determined during the specific periods defined by the consecutive scanning lines, while the same as to the horizontal direction are obtained by the specific provision of the respective detection periods Wp, Wpa, Wpb, Wpc and Wpd. Consequently, the two-dimentional character information can be provided by the sequential scanning.

It will be noted that only nine memory cell are required for the purpose of recognizing the characters 0 through 9 in accordance with the characteristic definition (a)–(i) in the illustrative embodiment. Although the above discussed characteristics can be determined only during a single scanning cycle, in order to enhance the reliability of character read out, the existence thereof is not confirmed until the desired number of the same characteristic determination results are provided.

Figure 4:
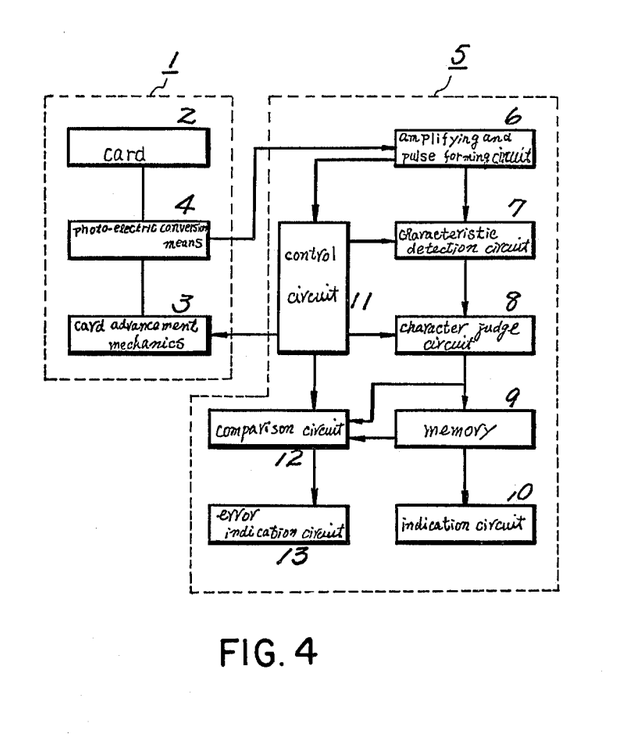
FIG. 4 is a schematic block diagram of a character recognition system embodying the present invention.

FIG. 4 is a schematic block diagram showing an embodiment of the character recognition system capable of reading and identifying the characters of FARRINGTON 7B FONT marked on the card. In this embodiment an array of photo-transistors is used to detect reflected light from the surface of the card so as to transmit intelligence signals contained thereon. This array comprises thirteen photo-transistors PT as shown in FIG. 2, and an additional two cells for allowing for any possible displacement of the card in the vertical direction.

As the card 2 is conveyed through a card advancement mechanism 3, the intelligence signals on the card are read out for example by means of photo-electric conversion means 4 as was previously described. These operations are carried out in a reader head 1. After the thus obtained intelligence signals are converted into pulse signals through an amplifying and pulse forming circuit 6 within a recognition and indication block 5, the converted signals are supplied to a characteristic detection circuit 7 and a character judge circuit 8 for identifying and recognizing the characters. These intelligence signals are stored in a memory 9 until recognition procedures are terminated for all of the characters on the card. Thereafter, the identified information is visually displayed on an indication circuit 10. The recognition and indication unit 5 is provided with a control circuit 11 which controls the characteristic detection circuit 7 and the character judge circuit 8 in response to one-character completion signals or all-character completion signals.

In addition, in the illustrative embodiment, signals detected by the control circuit 11 and indicating that all of the characters on the card have been read out control the card advancement mechanism 3 to move the card 2 in the backward direction. In the course of the backward advancement of the card 2 the intelligence signals contained thereon are again detected and compared with those obtained during the forward advancement and stored in the memory in a comparison circuit 12. If there is not an equivalence therebetween, an error indication circuit 13 is activated to indicate errors.

The photo-electric conversion circuit 4, characteristic detection circuit 7 and timing circuit within the control circuit 11 briefly discussed above will be now described with reference to FIGS. 5 through 10 inclusive to facilitate the understanding of the character recognition of the present invention.

Figure 5:
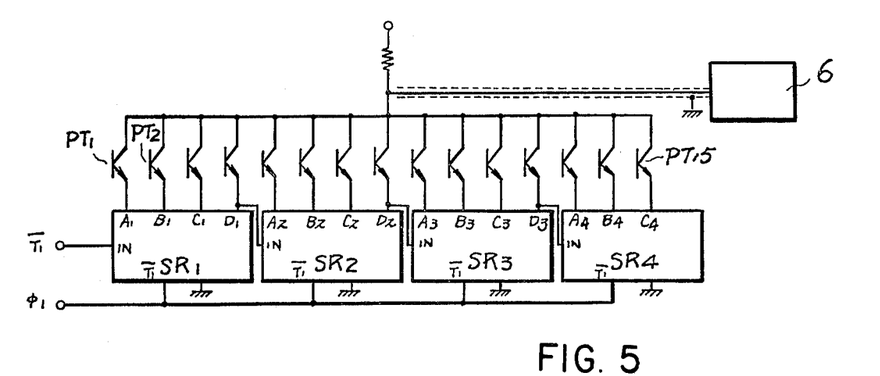
FIGS. 5 through 9 inclusive are circuit diagrams for the various blocks shown in FIG. 4.

In FIG. 5, there is illustrated the detailed photo-electric conversion circuit 4 which comprises the array of fifteen photo-transistors PT1, PT2 - - - PT15 as previously disclosed in relation to FIG. 2, and four four-bit shift registers SR1, SR2, SR3 and SR4. These photo-transistors operate in a charge storage mode and provide outputs from their connector terminals commonly connected at time $\overline{T1\phi1}$, which outputs in turn enter into the amplifying and pulse forming circuit 6.

Figure 6:
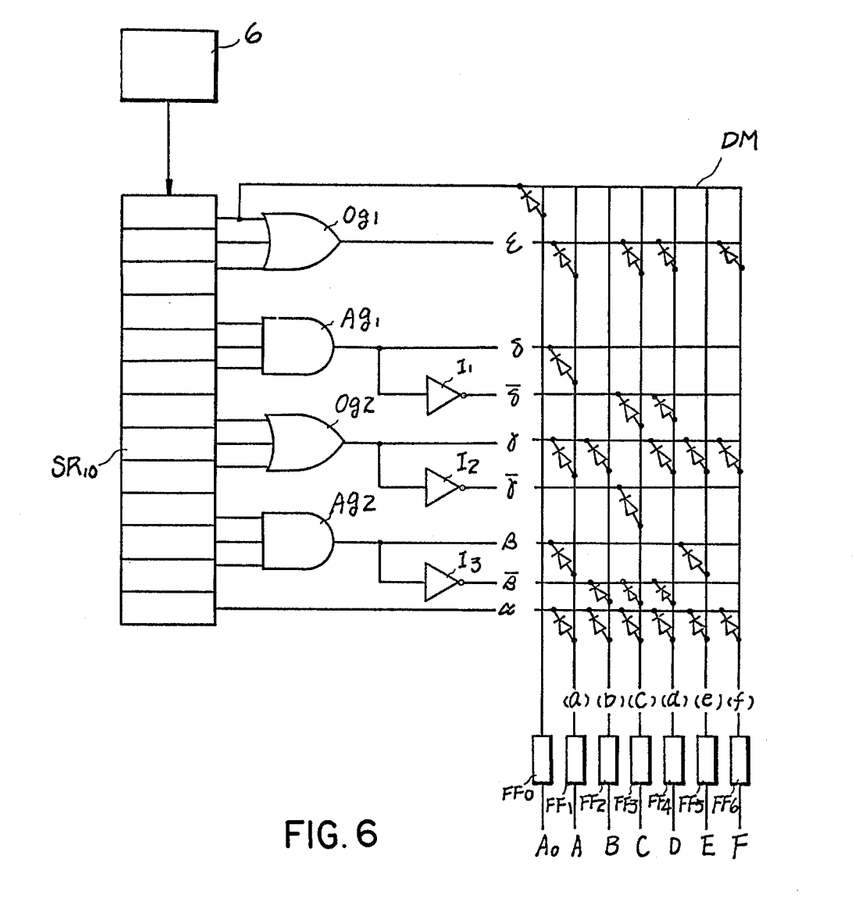

FIG. 6 shows a portion of the above discussed characteristic detection circuit having the function of detecting characteristics of the characters in the vertical direction during a single scanning cycle. In the form shown herein, a 13-bit register SR10 receives sequentially character signals from the amplifying and pulse reforming circuit 6. OR gates Og1 and Og2 and AND gates Ag1, Ag2 are operatively connected with appropriate stages of the shift register SR10, whereby the presence and absence of the read-out intelligence signals is sensed at any position of the five stages extending over the full length of the character in the vertical direction as shown in FIG. 2, to develop information-compressed outputs $\alpha$, $\beta$, $\overline{\beta}$, $\gamma$, $\overline{\gamma}$, $\delta$, $\overline{\delta}$, and $\epsilon$. I1, I2 and I3 represent inverter circuits. A diode matrix circuit DM is provided for encoding the above defined characteristics in the vertical direction and providing signals of waveforms $a$–$f$ as shown in FIG. 3 in accordance with the respective combinations of the outputs $\alpha$, $\beta$, $\overline{\beta}$, $\gamma$, $\overline{\gamma}$, $\delta$, $\overline{\delta}$ and $\epsilon$. Flip-flops FF1, FF2, FF3, - - - connected to the individual terminals A, B, C, D, E and F of the diode matrix circuit DM may be separately reset upon the receipt of the waveform signals $a$–$f$. The flip-flop FFo is connected to the first stage of the shift register SR10, and thus reset at the appearance of the first character signals to provide its output across the terminal Ao.

Figure 7:
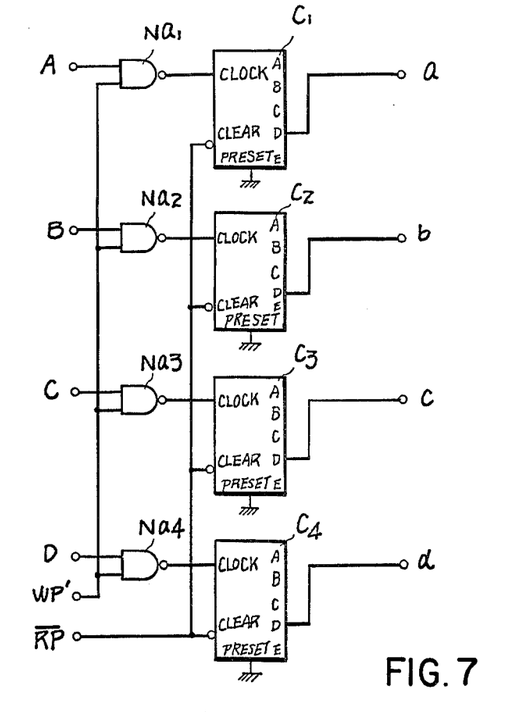
Figure 8:
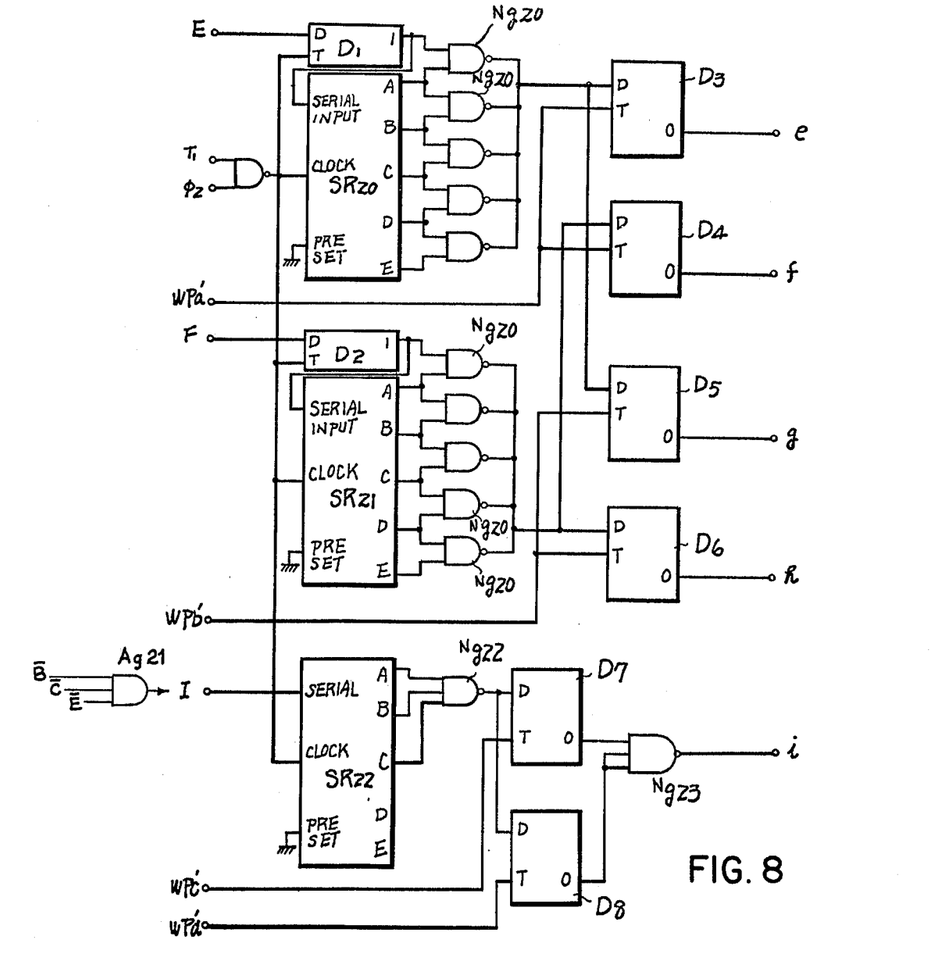

FIGS. 7 and 8 show another portion of the characteristic detection circuit 7 which serves to detect the character's characteristics in the horizontal direction. In other words, while the circuit of FIG. 6 determines the characteristics each time the scanning operation is effected, the circuits shown in FIGS. 7 and 8 count the number of the scanning cycles where the subject characteristics exist for the predetermined periods Wp, etc. in such a manner to detect the characteristics which meet the definition requirements as disclosed in FIG. 3.

The construction of the characteristic detection circuit 7 together with the mode of its operation will be described in more detail with reference to FIGS. 7, 8 and 9.

This circuit 7 includes NAND gates Na1, Na2, Na3 and Na4 and four 5-bit counters C1, C2, C3, C4 and C5 shown in FIG. 7. The individual NAND gates accept the outputs A, B, C and D and the signals during Wp indicating the specified characteristic detection during period Wp. With such an arrangement, the counters detect the count number of the characteristics (a)-(d) during the period Wp and confirm their existence if the counts therein exceed four.

FIG. 8 illustrates a circuit for detecting the characteristics (e), (f), (g), (h), and (i), wherein D type flip-flops D1, D2 are connected to receive the outputs E, F along with the timing signals T1$\phi$2, the output terminals of which are respectively connected to the five-bit shift registers SR20, SR21.

Furthermore, the output terminals of the D type flip-flops D1, D2 and the individual stages A, B, C, D and E of the shift registers SR20, SR21 are coupled to NAND gates Ng20. The outputs thereof are supplied to D type flip-flops D3, D4, D5 and D6 along with timing signals Wpa', Wpb' identifying the characteristic detection periods Wpa, Wpb to sense the characteristics (e), (f), (g) and (h).

Since the individual stages of the shift registers SR20, SR21 are connected to the NAND gates Ng20 as shown in the drawing, the D type flip-flops D3, D4, D5 and D6 produce signals indicating the existence of the characteristics (e), (f), (g) and (h) at the times Wpa' or Wpb' when two or more outputs E or F are viewed in succession. As was previously discussed in the foregoing, the characteristics (e) and (f) are equal to each other in waveform but exist during different periods. For this reason, though the pulse count for both the characteristics (e) and (f) is carried out on the same shift register SR20, the D type flip-flops D3, D4 activated at different times Wpa', Wpb' being provided to trigger the output stage of the shift register SR20 at different points in time.

The characteristic (i) is confirmed by logical sum outputs of the outputs $\overline{B}$, $\overline{C}$ and $\overline{E}$, thereby requiring an AND gate Ag21 for producing the sum output B·C·E. The outputs from the first through third stages of the five-bit shift register SR22 are introduced to the D terminals of the D type flip-flops D7, D8 via a NAND gate Ng22, the D type flip-flops D7, D8 having T terminals for the timing signals Wpc', Wpd' identifying the detection periods Wpc, Wpd. Therefore, if three signals of the waveform i appear in succession during the periods Wpc, Wpd, the flip-flops D7, D8 provide their outputs. A NAND gate Ng23 is provided pursuant to the above definition as to the characteristic (i). In this way, the characteristics (a)-(i) are all sensed and recognized.

Figure 9:
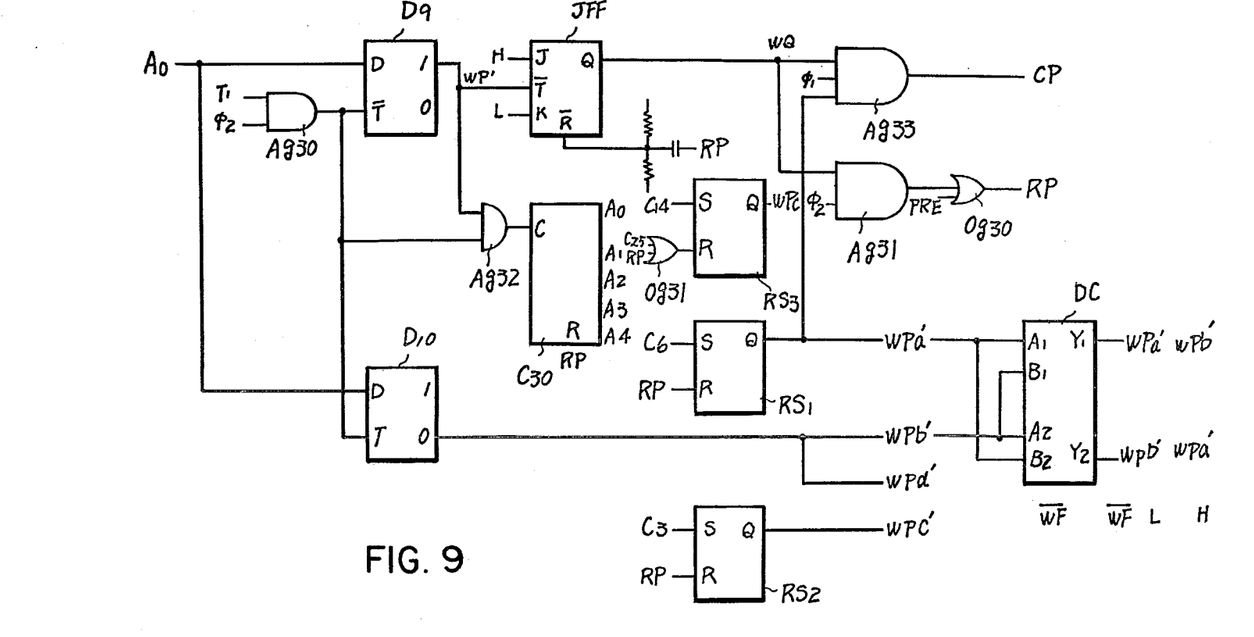

The timing circuit of FIG. 9 generates various timing signals such as the period identifying pulses Wp', Wpa', Wpb', Wpc', Wpd', reset pulses RP and character determining pulses Cp which appear at the end of the one-character scanning.

Figure 10:
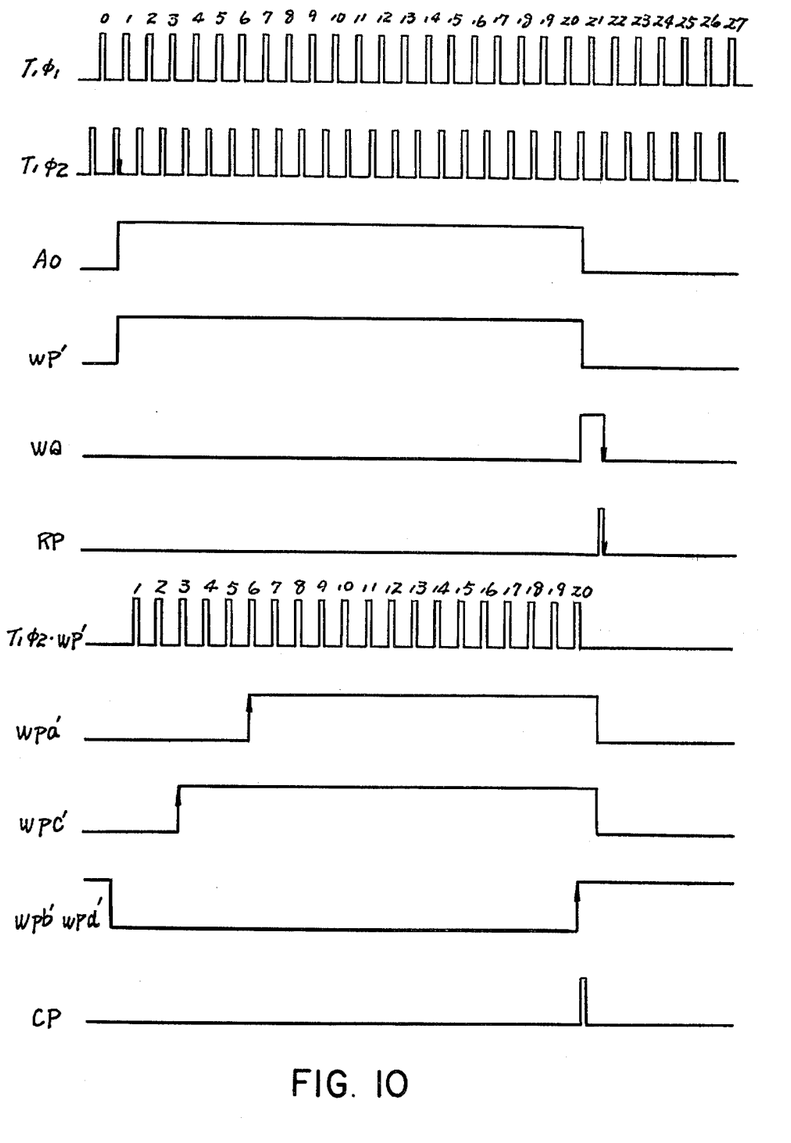
FIG. 10 is a timing diagram for the explanation of the timing circuit shown in FIG. 9.

The character read-out timing circuit of FIG. 9 will be described below as to its circuit implementation and operation mode with reference to the timing diagram of FIG. 10.

In FIG. 9, the reference symbols D9, D10 show D type flip-flops; the reference symbols RS1, RS2, RS3 show RS type flip-flops; the symbol JFF shows a JK type flip-flop; the symbols Ag30, Ag31, Ag32, Ag33 show AND gates; the symbols Og30, Og31 show OR gates; and the symbol C30 shows a 5-bit counter. The D type flip-flop D9 receives at the D terminal the output Ao shown in FIG. 6 and an AND output of the timing signal T1 and clock $\phi$2 through the AND gate Ag30, thereby producing from its output terminal the signal Wp' identifying the detection period Wp as shown in FIG. 10. By this signal Wp' applied to the trigger terminal $\overline{T}$ of the JK type flip-flop JFF, the flip-flop JFF senses the trailing edge of the signal Wp' or the end of the detection period Wp. The signal WQ in FIG. 10 illustrates the waveform of the output Q from the flip-flop JFF. The reset pulse RP shown in FIG. 10 is obtainable by either sensing the output WQ of the flip-flop JFF at the clock $\phi$2 through the AND gate Ag31 or producing the preset signal PRE. The resetting of the JK type flip-flop JFF is by the trailing edge of the reset pulse RP.

The five-bit counter C30 serves to count to the number of scanning cycles and more specifically to count the pulse number of signals T1$\phi$2 · Wp' derived from the AND gate Ag32 as the number of the scanning cycles. The signals Wpa', Wpc' which identify the characteristic detection period Wpa, Wpc respectively, develop across the output terminals Q of the RS type flip-flops RS1, RS2 controlled by the output from the counter C30. That is to say, the RS flip-flop RS1 is set when the outputs Ao, A1, A2, A3 and A4 of the counter C30 are in the condition of Ao·A1·A2·A3·A4, that is, when six scanning cycles (C6) are reached. At this time, the RS flip-flop RS1 provides the signals Wpa'. Similarly, the counter C30 provides the signal Wpc' when three scanning cycles (C3) are reached (the count state Ao·A1·A2·A3·A4 in the counter C30).

Since the remaining detection periods Wpb, Wpd terminate at the end of the detection period Wp, the generation of the signals Wpb', Wpd' therefore is attainable by sensing the trailing edge of the output Ao at the timing T1$\phi$2.

In FIG. 9 the AND gate Ag33 is provided to produce the character determining pulse CP when the output Q develops across the JK type flip-flop JFF at the clock time $\phi$1.

The RS type flip-flop RS3 for identifying the period Wcp is set when the five-bit counter C30 reaches the count "14" and then is reset when the same reaches the count "25". In other words, the recognizing of characters is carried out during the period from the scanning cycle 14 to the scanning cycle 25. In the event the character determining pulses CP are generated during such period Wcp, the recognition procedure will be inhibited to prevent any miss-operations.

A data selector DC (see FIG. 9) receives the above-discussed signals Wpa', Wpd' at its input terminals A1, B1, A2, B2 with receiving control signals applied to the SE terminal and switches the outputs at the terminals Y1, Y2 to the signals Wpa' or Wpb' in accordance with the combinations of the received inputs. In performing the character recognition procedure in the backward movement of the card, the selector DC functions to reverse the order of the sequence of the detection periods Wpa, Wpb and thus exchange the signals Wpa', Wpb' therefor. Nevetheless, the reversion of the order of the detection periods Wpc, Wpd is not required since they are used to sense only the numeral "1" and the numeral "1" is symmetrical with reference to line.

In such a way, the various control signals RP, Wpa', Wpb', Wpc' and Wpd' are supplied to the characteristic detection circuit as shown in FIGS. 7 and 8 for the purpose of the character determining. The character determining commands CP are created upon the termination of the characteristic detection and thereafter the characters are identified and recognized in the circuit 8 encoded into a given string of code signals and stored in the memory 9. The reset pulses RP serve to reset the detection circuit, timing circuit, etc.

The invention being thus described, it will be obvious that the same may be varied in many ways. Such variations are not to be regarded as a departure from the spirit and scope of the invention and all such modifications are intended to be included within the scope of the following claims.

We claim:

1. A character recognition method for scanning, reading and recognizing normalized characters consisting essentially of vertical and horizontal lines marked on a record medium, and in which the scanning cycle consists of consecutive optical scannings in a vertical direction of the field covered by a normalized character until the whole of a normalized character has also been scanned in a horizontal direction, comprising the steps of:

detecting specific vertical characteristics contained in the characters by the use of waveforms of specified characteristics synthesized from the signals obtained by a single scanning cycle in a vertical direction, and detecting the number of vertical scanning cycles in which said specified characteristics exist during the totality of the consecutive vertical scannings, said number being indicative of character characteristics in a horizontal direction, thereby detecting the two-dimensional characteristics contained in the characters.

2. A character recognition method for scanning, reading and recognizing normalized characters consisting essentially of vertical and horizontal lines marked on a recording medium, and in which the scanning cycle consists of consecutive optical scannings in a vertical direction of the field covered by a normalized character until the whole of a normalized character has been scanned in a horizontal direction, comprising the steps of:

detecting specified vertical characteristics contained in the characters in each vertical scanning cycle, establishing a plurality of different time periods by combining selected portions of said vertical characteristics from each scanning cycle effected in a vertical direction, employing signal information generated by scannings in a vertical direction to synthesize waveforms of specified characteristics for each of said different time periods, and detecting the number of occurrences of predetermined characteristics of the synthesized waveforms of specified characteristics for each of said different time periods for a plurality of consecutive vertical scans in a plurality of different horizontal positions, thereby detecting the two-dimensional characteristics contained with the characters.

3. The method as defined in claim 2, wherein the characteristics in the vertical direction are detected in an information compression mode.

4. The method as defined in claim 2, wherein an array of a plurality of vertically arranged and optically operating readout cells is provided to detect specified characteristics contained within the characters when scanned in a vertical direction.

5. The method as defined in claim 2, wherein the specified characteristics to be detected are defined by the number of outputs derived from the readout cells and scanning periods where the outputs exist.

6. The method as defined in claim 2, wherein the different time periods established comprise:

a first time period corresponding to a scanning period required for an entire normalized character, a second time period corresponding to a scanning period required for the initial scannings of a normalized character which are 30% of the total scannings, a third time period corresponding to a scanning period required for the final vertical scannings of a normalized character which are 30% of the total vertical scannings, a fourth time period corresponding to a scanning period required for the initial vertical scannings of a normalized character which are 15% of the total vertical scannings, and a fifth time period corresponding to a scanning period required for the final vertical scannings of a normalized character which are 15% of the total vertical scannings.

* * * * *